(12) United States Patent
Loreau

(10) Patent No.: US 8,362,390 B2
(45) Date of Patent: Jan. 29, 2013

(54) METHOD FOR WELDING MOTOR VEHICLE SEAT MEMBERS

(75) Inventor: Jean-Yves Loreau, Morigny Champigny (FR)

(73) Assignee: Faurecia Sieges d' Automobile, Nanterre (FR)

( * ) Notice: Subject to any disclaimer, the term of this patent is extended or adjusted under 35 U.S.C. 154(b) by 295 days.

(21) Appl. No.: 12/813,001

(22) Filed: Jun. 10, 2010

(65) Prior Publication Data

US 2010/0314928 A1   Dec. 16, 2010

(30) Foreign Application Priority Data

Jun. 11, 2009   (FR) ...................................... 09 53898

(51) Int. Cl.
*B23K 26/00* (2006.01)
(52) U.S. Cl. ......... 219/121.64; 219/121.11; 219/121.13; 219/121.45; 219/121.76; 219/121.77; 219/121.86
(58) Field of Classification Search .. 219/121.6–121.86, 219/121.11, 121.13, 121.45
See application file for complete search history.

(56) References Cited

U.S. PATENT DOCUMENTS

| | | | |
|---|---|---|---|
| 4,866,242 A | | 9/1989 | Martyr |
| 5,250,783 A | * | 10/1993 | Nishi et al. ................ 219/121.64 |
| 2004/0089641 A1 | * | 5/2004 | Launais et al. ........... 219/121.64 |

FOREIGN PATENT DOCUMENTS

| | | |
|---|---|---|
| FR | 2880307 A1 | 7/2006 |
| FR | 2890010 A1 | 3/2007 |
| JP | 04327385 A | 11/1992 |
| JP | 2005-21912 * | 1/2005 |
| JP | 2005144500 A | 6/2005 |

OTHER PUBLICATIONS

Search Report issued in French Patent Application 09/53898 dated Jan. 14, 2010.

* cited by examiner

*Primary Examiner* — Tan N Tran
(74) *Attorney, Agent, or Firm* — Vedder Price PC

(57) ABSTRACT

A method of laser welding of two members by their respective edges, on a first surface of a slideway section, wherein at least a first one of said members is welded by application of two parallel laser beams from a second surface of the slideway section, with a distance between the beams approximately corresponding to the thickness of the first member, to obtain a laser transmission welding in a single run.

6 Claims, 2 Drawing Sheets

- Prior Art -

METHOD FOR WELDING MOTOR VEHICLE SEAT MEMBERS

BACKGROUND OF THE INVENTION

1. Field of the Invention

The present invention generally relates to motor vehicle seats and, more specifically, the welding of parts together. The present invention more specifically relates to the welding of planar members by their edges on mobile slideway sections for vehicle seats.

2. Discussion of the Related Art

Motor vehicle seats are more and more often supported by slideways having a fixed section attached to the vehicle or to a seat support and having a mobile section capable of sliding with respect to the fixed section. The mobile section supports the seat framework and generally has the shape of an upside-down U. The seat framework is attached via vertical flanges welded to the upper surface (back of the U) of the mobile section. The weldings are performed by a laser welding technique where the beam is directed towards the junction between the parts to be welded.

FIG. 1 very schematically illustrates an example of conventional welding of a flange 40 on a U-shaped mobile section 3. The welding operations are performed laterally in two steps. A first run of a laser beam (symbolized by an arrow f1) performs welding 41 on one side of flange 40. A second run of the laser beam on the other side of the flange (symbolized by an arrow f2) performs a welding 42 on the other side. It is indeed necessary, to keep a proper resistance, to have a homogeneous welding over the entire area of contact between the materials forming the U-shaped section and flange 40.

The weldings are performed in a line due to the longitudinal shape of the sections. It can thus be seen that such a welding method requires two runs per flange 40 to be welded.

More recently, slideways for motor vehicle seats have been developed, on which two flanges (or the like members), parallel to each other in the longitudinal direction of the section, must be welded by their edges. A concern then is that the proximity of the flanges prevents any access to the internal side of the second flange to be welded.

SUMMARY OF THE INVENTION

It would be desirable to have a welding technique enabling to save time in the attaching of flanges to mobile slideway sections for motor vehicle seats.

It would also be desirable to simplify the welding operations and to provide a homogeneous welding quality to two parallel flanges or the like members.

More generally, a laser welding technique is needed, which provides a homogeneous welding of a plate perpendicularly to a plane even though the sides of this plate are not accessible for lateral weldings.

To achieve all or part of these and other objects, the present invention provides a method of laser welding of two members by their respective edges, on a first surface of a slideway section, wherein at least a first one of said members is welded by application of two parallel laser beams from a second surface of the slideway section, with a distance between the beams approximately corresponding to the thickness of the first member, to obtain a laser transmission welding in a single run.

According to an embodiment of the present invention, a second one of said members is also welded by laser transmission welding, by application of said laser beams from the second surface of the slideway section.

According to an embodiment of the present invention, the slideway section is a mobile U-shaped section of a slideway for a motor vehicle seat, said members being formed of metal flanges to be welded to the back of the U, the laser beams being oriented so as to be applied from the internal surface of the U.

According to an embodiment of the present invention, said members are welded approximately parallel to each other by means of said laser beams.

According to an embodiment of the present invention, said members are welded in two successive runs.

The present invention also provides a slideway for an automobile vehicle seat, comprising a fixed section and a mobile section, the mobile section having an approximately U-shaped cross-section with a base intended to receive, at its external surface, two flanges welded by their respective edges.

The present invention also provides a motor vehicle seat comprising such a slideway.

The foregoing objects, features, and advantages of the present invention will be discussed in detail in the following non-limiting description of specific embodiments in connection with the accompanying drawings.

DETAILED DESCRIPTION

Figure 1:
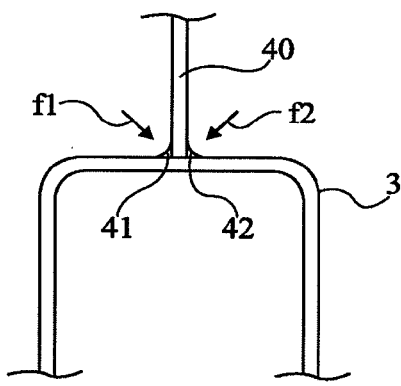
FIG. 1, previously described, is intended to show the state of the art and the problem to solve.

The same elements have been designated with the same reference numerals in the different drawings. For clarity, only those elements which are useful to the understanding of the present invention have been shown and will be described. In particular, the nature of the laser used in the welding method has not been detailed, the present invention being compatible with known dual-beam lasers. Further, the types of members to be welded to the mobile section have not been all detailed either, the present invention being here again compatible with usual weldings.

Figure 2:
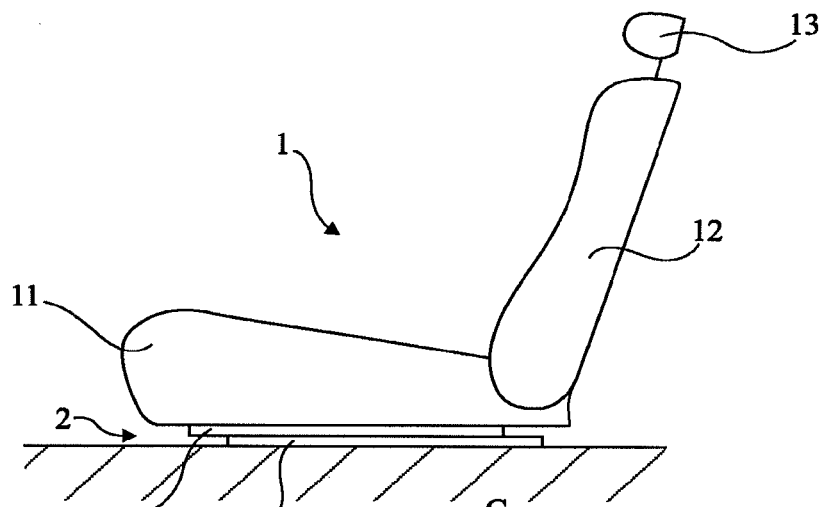
FIG. 2 is a simplified lateral view of a motor vehicle seat of the type to which the present invention applies.

FIG. 2 is a lateral view of a seat 1 for a motor vehicle. Such a seat comprises a seating part 11 on which is hinged a backrest 12, possibly topped with a head restraint 13. The seat is supported by a slideway 2 having a fixed section 22 attached to frame C of the vehicle, either directly or via a support, not shown, and having a mobile section 3 supporting the seat and capable of sliding with respect to fixed section 22.

Figure 3:
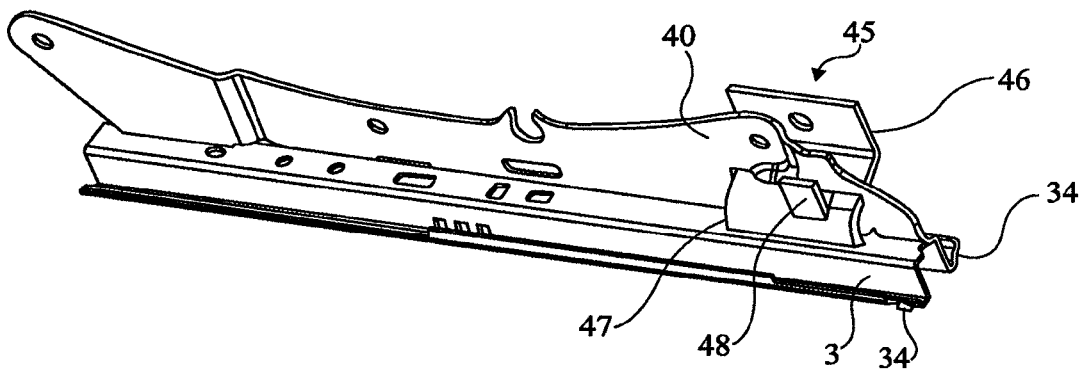
FIG. 3 is a simplified view of a slideway for a vehicle seat.

FIG. 3 is a perspective view detailing an example of slideway 2.

Figure 4:
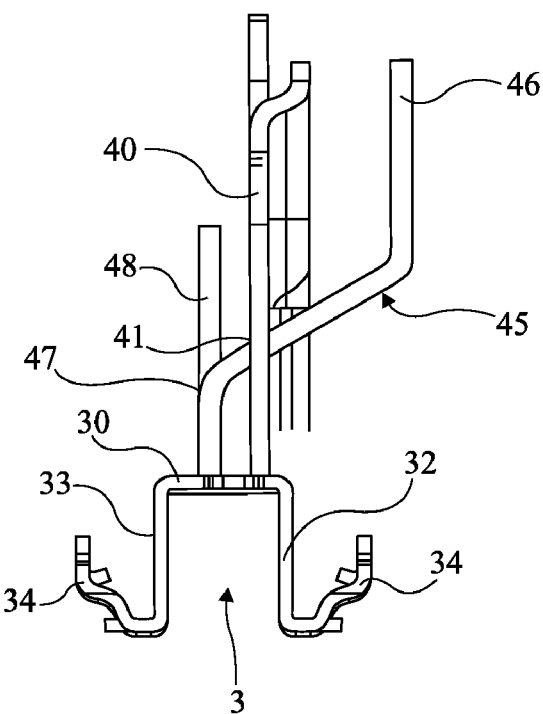
FIG. 4 is a simplified view of the mobile section of the slideway of FIG. 3.

FIG. 4 is a transverse view of mobile section 3 of slideway 2.

Mobile section 3 has the shape of a downward-facing U having its base 30 intended to receive, on the external side, at least one flange 40 to which the seating framework (not shown) is attached. The other framework members have not been illustrated. The two vertical branches 32 and 33 of mobile section 3 end with flaps 34 intended to be engaged into spaces made between lateral flanges and reentrant troughs (not shown) of fixed section 22.

Two members 40 and 45 are attached by their edges to the external surface (on top in the orientation of the drawing) of the U shape. As indicated in relation with FIG. 1, these weldings are conventionally performed laterally. Members 40 and 45 are members for receiving the seat, for example, a flange 40 of the type in FIG. 1 and a stalk support 45 intended to retain a buckle for fastening the seat belt with respect to the seat. Support 45 has a curved shape and crosses a port 41 made at the back of flange 40. Upper portion 46 of support 45 is intended to receive the seat belt fastener. Lower portion 47 of the support is intended to be welded by its edge to the external surface of base 30 of the U. If desired, a lug 48 may extend vertically from a portion of stalk support 45.

Stalk support 45 or another vertical member does not necessarily extend over the entire slideway, as is the case for flange 40. However, the situation is such that two members approximately parallel to each other must be welded at their edges to a plane approximately parallel to these edges, so that the space between the two members to be welded prevents the laser beam from passing and from having the desired orientation. It can be considered that support 45 forms a second flange having a length shorter than that of flange 40. To simplify the following description, these two members 40 and 45 will be designated as flanges.

Figure 5:
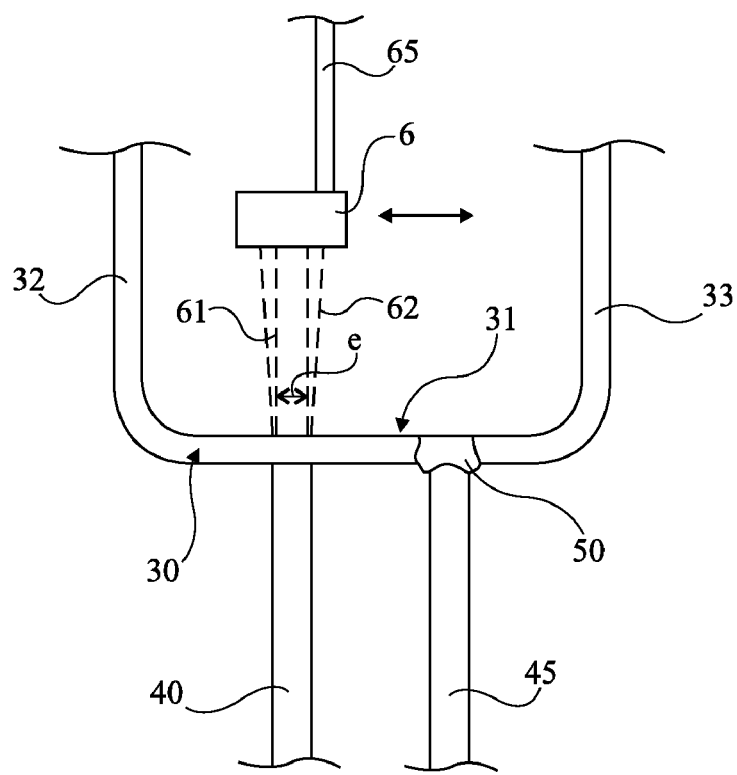
FIG. 5 is a simplified cross-section view illustrating an embodiment of the welding method.

FIG. 5 is a simplified cross-section view illustrating an embodiment of the welding method according to the present invention.

The welding is no longer performed from the external surface of base 30 of the U-shaped section but from its internal surface 31 which remains free during the manufacturing of the slideway. Thus, the weldings are so-called laser transmission weldings.

It could have been devised to perform the transmission weldings in two successive runs of a laser beam above the two edges of the members to be welded. This would already solve the access problem but would take time. Thus, in the embodiment of FIG. 5, it is provided to use a laser with two parallel beams (symbolized by a block 6 and a support 65). The two beams 61 and 62 are separated from one another by a distance e approximately corresponding to the width of the edge of member 40 or 45 to be welded. Thus, in a single run, it is possible to perform a transmission welding 50 which properly fastens the member. In FIG. 5, it is assumed that the laser has, in a first run, welded flange 45 (welding 50), then has been moved transversely to, in a second run, weld flange 40. Distance e may be adapted from one member to the other.

As a variation, flange 40 may be welded conventionally since, before presentation of flange 45, both its sides are accessible.

Dual-beam lasers are known per se. For example, article "An experiment in which a high-power $CO_2$ laser beam was split into two equal-power beams that were then used as a welding heat source indicated the dual-beam laser could significantly improved weld quality" by J. Xie, published in WELDING JOURNAL, October 2002 (pages 223 to 230), describes the obtaining of two beams with a carbon dioxide laser.

An advantage of the present invention is that starting the welding from the internal surface makes it possible to weld two parallel members to the back of a mobile slideway member section.

Another advantage is that the use of a dual-beam or dual-head laser considerably increases the production speed.

Various embodiments have been described. Various alterations and modifications will occur to those skilled in the art. In particular, the selection of the type of laser to be used for the weldings depends on the materials forming the members to be welded. In the example of a slideway, all the members are made of steel.

Further, the practical implementation of the present invention is within the abilities of those skilled in the art based on the functional indications given hereabove and on the dual-beams lasers known per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of laser welding of two members by their respective edges, on a first surface of a slideway section, wherein at least a first one of said members is welded by application of two parallel laser beams from a second surface of the slideway section, with a distance between the beams approximately corresponding to the thickness of the first one of said members, to obtain a laser transmission welding in a single run, and wherein the slideway section is a mobile U-shaped section of a slideway for a motor vehicle seat, said members being formed of metal flanges to be welded to the back of the U-shaped section, the laser beams being oriented so as to be applied from the internal surface of the U-shaped section.

2. The method of claim 1, wherein a second one of said members is also welded, by laser transmission welding, by application of said laser beams from the second surface of the slideway section.

3. The method of claim 1, wherein said members are welded approximately parallel to each other by means of said laser beams.

4. The method of claim 3, wherein said members are welded in two successive runs.

5. A slideway for an automobile vehicle seat, comprising a fixed section and a mobile section, the mobile section having an approximately U-shaped cross-section with a base intended to receive, at its external surface, two flanges welded by their respective edges, the weldings being obtained by application of the method of claim 1.

6. A motor vehicle seat comprising the slideway of claim 5.

* * * * *